United States Patent
Aitken

(10) Patent No.: US 12,366,323 B2
(45) Date of Patent: Jul. 22, 2025

(54) BRACKET ASSEMBLY AND METHOD FOR SUPPORTING A PORTABLE ELEMENT ON A STRUCTURE ELEMENT

(71) Applicant: SACO Technologies Inc., St-Laurent (CA)

(72) Inventor: James Aitken, Westmount (CA)

(73) Assignee: SACO TECHNOLOGIES INC., St-Laurent (CA)

( * ) Notice: Subject to any disclaimer, the term of this patent is extended or adjusted under 35 U.S.C. 154(b) by 0 days.

(21) Appl. No.: 18/394,093

(22) Filed: Dec. 22, 2023

(65) Prior Publication Data

US 2024/0209980 A1 Jun. 27, 2024

Related U.S. Application Data

(60) Provisional application No. 63/434,954, filed on Dec. 23, 2022.

(51) Int. Cl.
*F16M 13/02* (2006.01)
*E04B 1/38* (2006.01)
*F16B 2/10* (2006.01)
*F16B 2/14* (2006.01)

(52) U.S. Cl.
CPC .......... *F16M 13/022* (2013.01); *E04B 1/388* (2023.08); *F16B 2/10* (2013.01); *F16B 2/14* (2013.01); *E04B 2001/389* (2023.08)

(58) Field of Classification Search
CPC . E04B 1/388; E04B 2001/389; F16M 13/022; F16B 2/10; F16B 2/14
See application file for complete search history.

(56) References Cited

U.S. PATENT DOCUMENTS

| | | | | | |
|---|---|---|---|---|---|
| 3,784,140 | A | * | 1/1974 | Auerbach | H01J 9/006 248/230.4 |
| 3,888,440 | A | * | 6/1975 | Rebentisch | A47B 57/42 248/222.13 |
| 3,888,441 | A | * | 6/1975 | Rebentisch | H02G 3/263 248/73 |
| 10,619,343 | B2 | * | 4/2020 | Heady | B21D 35/001 |
| 10,718,364 | B2 | * | 7/2020 | Isom | F16B 2/10 |
| 2019/0193249 | A1 | * | 6/2019 | Burnett | B25B 5/12 |
| 2019/0285225 | A1 | * | 9/2019 | Scott | B25H 3/02 |
| 2020/0393115 | A1 | * | 12/2020 | Navabi | F21V 21/088 |

(Continued)

*Primary Examiner* — Monica E Millner
(74) *Attorney, Agent, or Firm* — BCF LLP

(57) ABSTRACT

A bracket assembly and method for supporting portable element on a structure element using a bracket assembly are disclosed. The bracket assembly includes a cylindrical body, a holding bracket, a groove element including a body defining a groove shaped for conforming to and receiving a first portion of the structure element, a main bracket including a central portion, and a first leg element and a second leg element including grasping end sections for grasping a second portion of the structure element, the main bracket and the holding bracket being configured to cooperate so as to collaboratively form an open-ended channel, and an elongated wedge-shaped element selectively moving in the open-ended channel, when the elongated wedge-shaped element is slidably moved from a first position to a second position, a clamping force applied by the bracket assembly on the structure element is increased.

20 Claims, 15 Drawing Sheets

(56) References Cited

U.S. PATENT DOCUMENTS

| | | | |
|---|---|---|---|
| 2021/0076911 A1* | 3/2021 | Golden | F16B 2/22 |
| 2022/0341539 A1* | 10/2022 | Follis | F16B 7/042 |
| 2022/0349520 A1* | 11/2022 | Chung | A47B 95/00 |
| 2022/0356989 A1* | 11/2022 | Herst | F16M 11/06 |

* cited by examiner

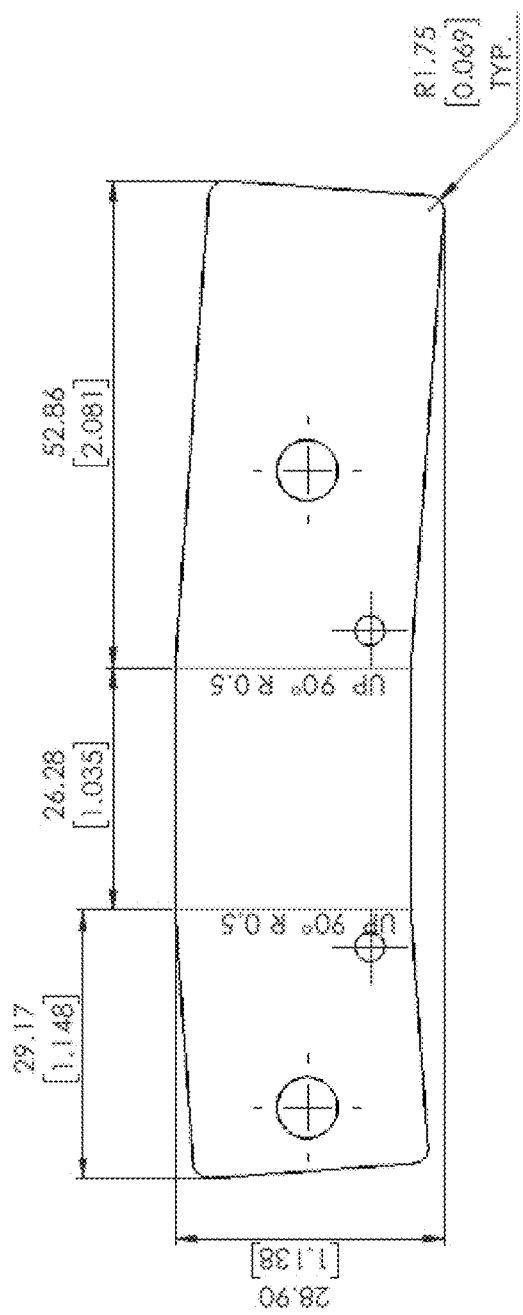
FIG. 13A
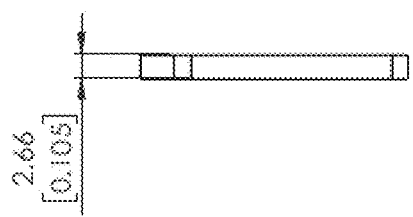
FIG. 13C
FIG. 13B

BRACKET ASSEMBLY AND METHOD FOR SUPPORTING A PORTABLE ELEMENT ON A STRUCTURE ELEMENT

CROSS-REFERENCE TO RELATED APPLICATIONS

The present application claims priority to U.S. Provisional Patent Application No. 63/434,954 titled "BRACKET ASSEMBLY AND METHOD FOR SUPPORTING A PORTABLE ELEMENT ON A STRUCTURE ELEMENT", filed Dec. 23, 2022, the entirety of which is incorporated by reference herein.

TECHNICAL FIELD

The present technology relates to brackets for supporting portable equipment, and more specifically although not exclusively to a bracket assembly for supporting a portable element on a structure element.

BACKGROUND

Support for portable equipment can be provided using brackets. Such brackets may be configured to be attachable to the portable equipment, and may be actuated to be secured to a structure element onto which the portable element should be connected.

Brackets are typically adapted to engage the structure element at a pre-determined location thereof. For example, openings, recesses or any other dedicated element may be provided and/or defined on the structure element to receive the bracket. Usage of the bracket is thus, in most cases, planned upon defining the structure element, which greatly facilitates installation of the bracket and the portable element.

However, in some cases, the structure element may be conceived without any requirement regarding a later use of brackets. Once the structure element has been installed (e.g. on outer walls of a built tower), it may be arduous to install any portable element on the structure element given that no consideration was taken upon designing the structural element.

Therefore, there is a need for bracket assemblies suitable for supporting portable equipment on a structural element that does not define any dedicated element for being connected to a bracket assembly.

SUMMARY

Implementations of the present technology have been developed based on inventors' appreciation of at least one shortcoming associated with the prior art approaches to brackets for supporting portable equipment.

Accordingly, from a first broad aspect of the present disclosure, there is provided a bracket assembly for clamping onto a structure element, the bracket assembly including a cylindrical body extending along a main axis, a holding bracket, a groove element, a main bracket and an elongated wedge-shaped element. The cylindrical body includes a central portion and a first leg and a second leg, the first and second legs extending away from the central portion, the first and second legs being configured to receive the cylindrical body. The groove element includes a body defining a groove shaped for conforming to and receiving a first portion of the structure element, the body being in mechanical contact with the central portion of the holding bracket; and a third leg and a fourth leg, the third and fourth legs extending away from the body, the third and fourth legs being configured to receive the cylindrical body. The main bracket includes an other central portion and a first leg element and a second leg element extending away from the other central portion, the first and second leg elements including grasping end sections configured to grasp a second portion of the structure element. The main bracket and the holding bracket cooperate so as to collaboratively form an open-ended channel between the central portion and the other central portion. The elongated wedge-shaped element is disposed between the central portion and the other central portion, the elongated wedge-shaped element including a first end and a second end, a thickness of the elongated wedge-shaped element increasing from the first end to the second end. The elongated wedge-shaped element selectively moves within the open-ended channel between a first position and a second position, in the first position a first portion of the elongated wedge-shaped element cooperates with the open-ended channel, the first portion having a first thickness, in the second position a second portion the elongated wedge-shaped element cooperates with the open-ended channel, the second portion having a second thickness, the second thickness being larger than the first thickness. The elongated wedge-shaped element cooperates with the central portion and the other central portion such that: when the elongated wedge-shaped element is slidably moved from the first position to the second position, the central portion is urged away from the other central portion thereby increasing a clamping force applied by the grasping end sections and the groove element on the structure element.

In some implementations, the cylindrical body is a pin.

In some implementations, the bracket assembly further includes a snapping lever connectable to the bracket assembly, the snapping lever configured to releasably lock the elongated wedge-shaped element in the second position.

In some implementations, the main bracket is a plate member bent into shape.

In some implementations, the elongated wedge-shaped element is selectively movable along a plurality of intermediate positions between the first position and the second position.

In some implementations, a width of the main bracket is between 60 mm and 65 mm.

In some implementations, the main bracket is formed of stainless steel.

In some implementations, the groove element is formed of glass-filled polycarbonate.

In some implementations, the first leg element defines a first opening for receiving the first and third legs, and the second leg element defines a second opening for receiving the second and fourth legs.

In some implementations, the first and second leg elements are bent to form the grasping end sections.

In a second broad aspect of the present technology, there is provided a kit for a bracket assembly, the kit including a cylindrical body extending along a main axis, a holding bracket, a groove element, a main bracket and an elongated wedge-shaped element. The holding bracket includes a central portion and a first leg and a second leg, the first and second legs extending away from the central portion, the first and second legs being configured to receive the cylindrical body. The groove element includes a body defining a groove shaped for conforming to and receiving a first portion of the structure element, the body being in mechanical contact with the central portion of the holding bracket;

and a third leg and a fourth leg, the third and fourth legs extending away from the body, the third and fourth legs being configured to receive the cylindrical body. The main bracket includes an other central portion and a first leg element and a second leg element extending away from the other central portion, the first and second leg elements including grasping end sections configured to grasp a second portion of the structure element. The main bracket and the holding bracket cooperate so as to collaboratively form an open-ended channel between the central portion and the other central portion. The elongated wedge-shaped element is disposed between the central portion and the other central portion, the elongated wedge-shaped element including a first end and a second end, a thickness of the elongated wedge-shaped element increasing from the first end to the second end. The elongated wedge-shaped element selectively move within the open-ended channel between a first position and a second position, in the first position a first portion of the elongated wedge-shaped element cooperates with the open-ended channel, the first portion having a first thickness, in the second position a second portion the elongated wedge-shaped element cooperates with the open-ended channel, the second portion having a second thickness, the second thickness being larger than the first thickness. The elongated wedge-shaped element cooperates with the central portion and the other central portion such that: when the elongated wedge-shaped element is slidably moved from the first position to the second position, the central portion is urged away from the other central portion thereby increasing a clamping force applied by the grasping end sections and the groove element on the structure element.

In some implementations, the kit includes an other holding bracket.

In some implementations, the kit further includes a snapping lever connectable to the bracket assembly, the snapping lever configured to releasably lock the elongated wedge-shaped element in the second position.

In some implementations, the main bracket is a plate member bent into shape.

In a third broad aspect of the present technology, there is provided a mountable module including a portable equipment, at least one bracket assembly and a locking device. The portable equipment includes an elongated body and a panel pivotably connected to the body between an open configuration and a close configuration, an axis of rotation of the panel with respect to the elongated body being substantially parallel to the first direction. Each of the at least one bracket assembly includes a cylindrical body extending along a main axis, a holding bracket, a groove element, a main bracket and an elongated wedge-shaped element. The holding bracket includes a central portion and a first leg and a second leg, the first and second legs extending away from the central portion, the first and second legs being configured to receive the cylindrical body. The groove element includes a body defining a groove shaped for conforming to and receiving a first portion of the structure element, the body being in mechanical contact with the central portion of the holding bracket and a third leg and a fourth leg, the third and fourth legs extending away from the body, the third and fourth legs being configured to receive the cylindrical body. The main bracket includes an other central portion and a first leg element and a second leg element extending away from the other central portion, the first and second leg elements including grasping end sections configured to grasp a second portion of the structure element. The main bracket and the holding bracket cooperate so as to collaboratively form an open-ended channel between the central portion and the other central portion. The elongated wedge-shaped element is disposed between the central portion and the other central portion, the elongated wedge-shaped element including a first end and a second end, a thickness of the elongated wedge-shaped element increasing from the first end to the second end. The elongated wedge-shaped element selectively move within the open-ended channel between a first position and a second position, in the first position a first portion of the elongated wedge-shaped element cooperates with the open-ended channel, the first portion having a first thickness, in the second position a second portion the elongated wedge-shaped element cooperates with the open-ended channel, the second portion having a second thickness, the second thickness being larger than the first thickness. The elongated member cooperate with the central portion and the other central portion such that: when the elongated wedge-shaped element is slidably moved from the first position to the second position, the central portion is urged away from the other central portion thereby increasing a clamping force applied by the grasping end sections and the groove element on the structure element. The locking device configured to engage an end portion of the cylindrical body extending, upon the panel being in the close configuration, through an opening defined in the panel, and thus lock the panel in the closed configuration.

In some implementations, the mountable module further includes a lighting system mounted on the portable element to emit light at least partly away from the at least one bracket assembly.

In some implementations, the cylindrical body is a pin.

In some implementations, the bracket assembly further includes a snapping lever connectable to the bracket assembly, the snapping lever configured to releasably lock the elongated wedge-shaped element in the second position.

In some implementations, the main bracket is a plate member bent into shape.

In some implementations, the elongated wedge-shaped element extends at least in part orthogonally to the main axis of the cylindrical body.

In some implementations, the at least one bracket assembly is two bracket assemblies.

In a fourth broad aspect of the present technology, there is provided a method for operating a bracket assembly, the bracket assembly for clamping to a structure element, the structure element having a fin-shaped cross-section, the structure element defining a tip portion and a base portion. The bracket assembly includes a cylindrical body extending along a main axis, a holding bracket, a groove element, a main bracket and an elongated wedge-shaped element. The holding bracket includes a central portion and a first leg and a second leg, the first and second legs extending away from the central portion, the first and second legs being configured to receive the cylindrical body. The groove element includes a body defining a groove shaped for conforming to and receiving a first portion of the structure element, the body being in mechanical contact with the central portion of the holding bracket: and a third leg and a fourth leg, the third and fourth legs extending away from the body, the third and fourth legs being configured to receive the cylindrical body. The main bracket includes an other central portion and a first leg element and a second leg element extending away from the other central portion, the first and second leg elements including grasping end sections configured to grasp a second portion of the structure element. The main bracket and the holding bracket cooperate so as to collaboratively form an open-ended channel between the central portion and the other central portion. The elongated wedge-shaped element is disposed between the central portion and the other central portion, the elongated wedge-shaped element including a first end and a second end, a thickness of the elongated wedge-shaped element increasing from the first end to the second end. The elongated wedge-shaped element selectively moves within the open-ended channel between a first position and a second position, in the first position a first portion of the elongated wedge-shaped element cooperates with the open-ended channel, the first portion having a first thickness, in the second position a second portion the elongated wedge-shaped element cooperates with the open-ended channel, the second portion having a second thickness, the second thickness being larger than the first thickness. The elongated wedge-shaped element cooperates with the central portion and the other central portion such that: when the elongated wedge-shaped element is slidably moved from the first position to the second position, the central portion is urged away from the other central portion thereby increasing a clamping force applied by the grasping end sections and the groove element on the structure element. The method includes disposing the bracket assembly on the structure element such that the tip portion of the structure element is received in the groove of the groove element and that the grasping end sections of a first and second leg elements grasp the base portion of the structure element: and increasing a size of the open-ended channel by slidably moving the elongated wedge-shaped element from the first position to the second position and to increase the clamping force onto the structure element by the grasping end sections and the groove element.

In some implementations, the bracket assembly further comprises a snapping lever connected to the bracket assembly, the method further including locking the elongated wedge-shaped element in the second position using the snapping lever.

In some implementations, the method further includes decreasing the size of the open-ended channel by slidably moving the elongated wedge-shaped element from the second position to the first position and to reduce the clamping force onto the structure element by the grasping end sections and the groove element.

In some implementations, the method further includes connecting the bracket assembly to an elongated body of a portable element, the portable element comprising an elongated body and a panel pivotably connected to the body between an open configuration and a close configuration, an axis of rotation of the panel with respect to the elongated body being substantially parallel to the first direction.

In some implementations, the method further includes actuating the panel in the close configuration.

In some implementations, the method further includes locking the panel to the bracket assembly.

In some implementations, the panel defines an opening for at least partially inserting the cylindrical body upon being in the close configuration, and locking the panel to the bracket assembly includes employing a locking device configured to engage an end portion of the cylindrical body extending through the opening to lock the panel in the closed configuration.

In some implementations, the second leg of the holding bracket extends beyond the cylindrical body and defines recesses on lateral surfaces of an end portion thereof, the elongated body of the portable element defines a clipping structure comprising two protrusions separated by a predetermined distance and facing each other: and connecting the bracket assembly to the elongated body of the portable equipment includes inserting the end portion of the second leg of the holding bracket in the clipping structure of the elongated body such that each protrusion of the clipping structure is located in one of the recesses.

In a fifth broad aspect of the present technology, there is provided a method for assembling a bracket assembly. The method includes disposing a snapping lever between a groove element and a holding bracket, the holding bracket including a central portion; and a first leg and a second leg, the first and second legs extending away from the central portion and toward a first direction, the groove element including a body defining a groove shaped for conforming to and receiving a first portion of a structure element on a first side of the groove element, the body being in mechanical contact with the central portion of the holding bracket when assembled: and a third leg and a fourth leg, the third and fourth legs extending away from the body on a second side opposite to the first side and toward the first direction, the second side of the body being at least in part in mechanical contact with the central portion of the holding bracket such that a portion of the snapping lever is sandwiched between the groove element and the holding bracket. The method further includes inserting the first and third legs in a first opening of a main bracket, and the second and fourth legs in a second opening of the main bracket, the main bracket including an other central portion substantially parallel to the central portion: and a first leg element and a second leg element extending away from the other central portion and away from the first direction, the first and second leg elements having grasping end sections configured to grasp a second portion of the structure element. The main bracket and the holding bracket cooperate so as to collaboratively form an open-ended channel between the central portion and the other central portion. The method further includes inserting an elongated wedge-shaped element disposed between the first central portion and the second central portion in the open-ended channel. The elongated wedge-shaped element includes a first end and a second end, a thickness of the elongated wedge-shaped element increasing from the first end to the second end, the elongated wedge-shaped element being configured to selectively move within the open-ended channel between a first position and a second position, in the first position a first portion of the elongated wedge-shaped element cooperates with the open-ended channel, the first portion having a first thickness, in the second position a second portion the elongated wedge-shaped element cooperates with the open-ended channel, the second portion having a second thickness, the second thickness being larger than the first thickness. The snapping lever releasably locks the elongated wedge-shaped element in the second position. The method further includes securing the first, second, third and fourth legs to a cylindrical body extending orthogonally to the first direction.

These and other aspects and features of non-limiting implementations will now become apparent to those skilled in the art upon review of the following description of specific non-limiting implementations in conjunction with the accompanying drawings.

DETAILED DESCRIPTION OF THE DRAWINGS

The non-limiting implementations will be more fully appreciated by reference to the accompanying drawings, in which:

FIGS. 13A, 13B and 13C are respectively a flatten view, a side elevation view and a cross section view of the holding member of the bracket assembly of FIG. 1 in accordance with a non-limiting implementation of the present technology:

Figure 1:
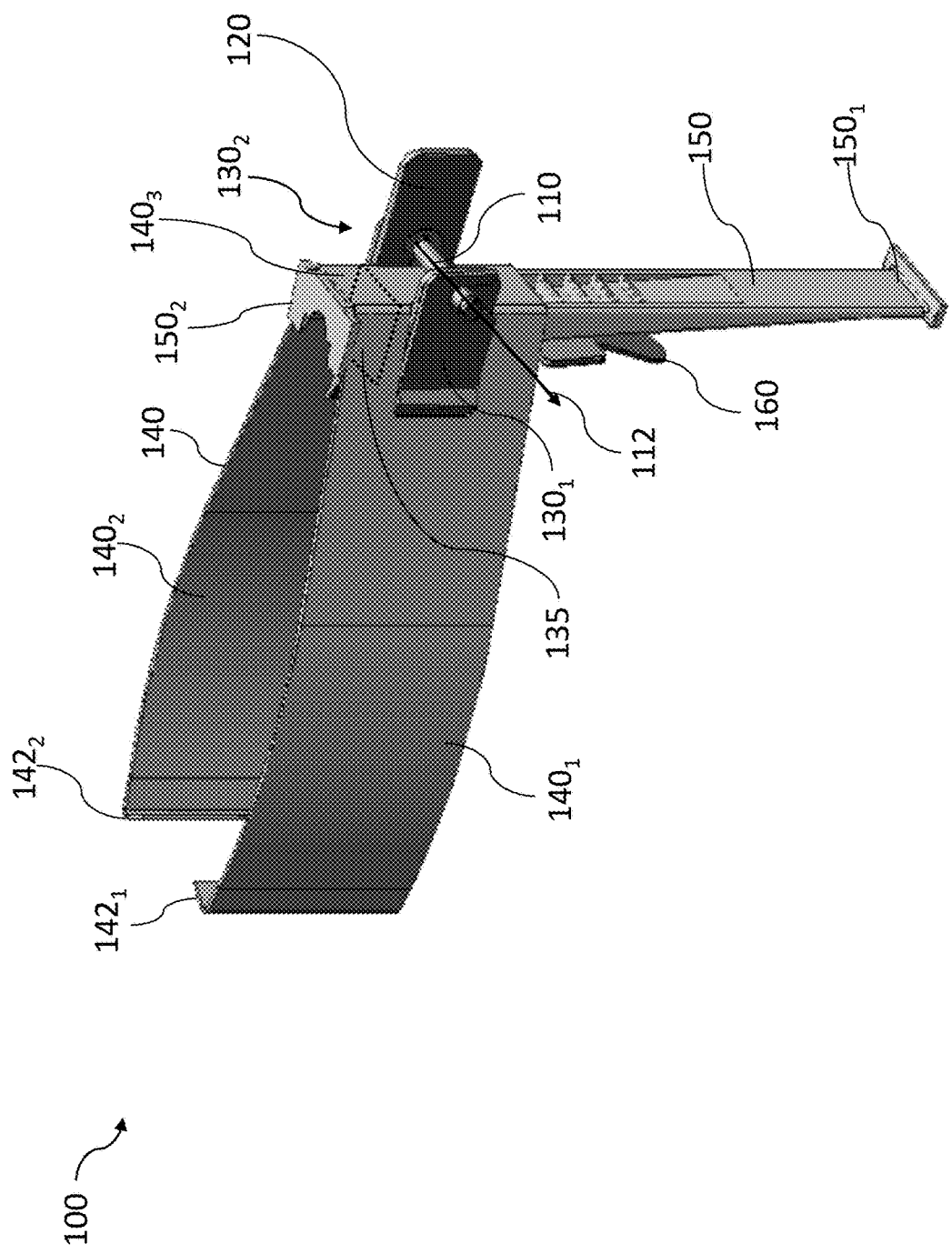
FIG. 1 is a perspective view taken from a front top left corner of a bracket assembly in accordance with a non-limiting implementation of the present technology.
Figure 2:
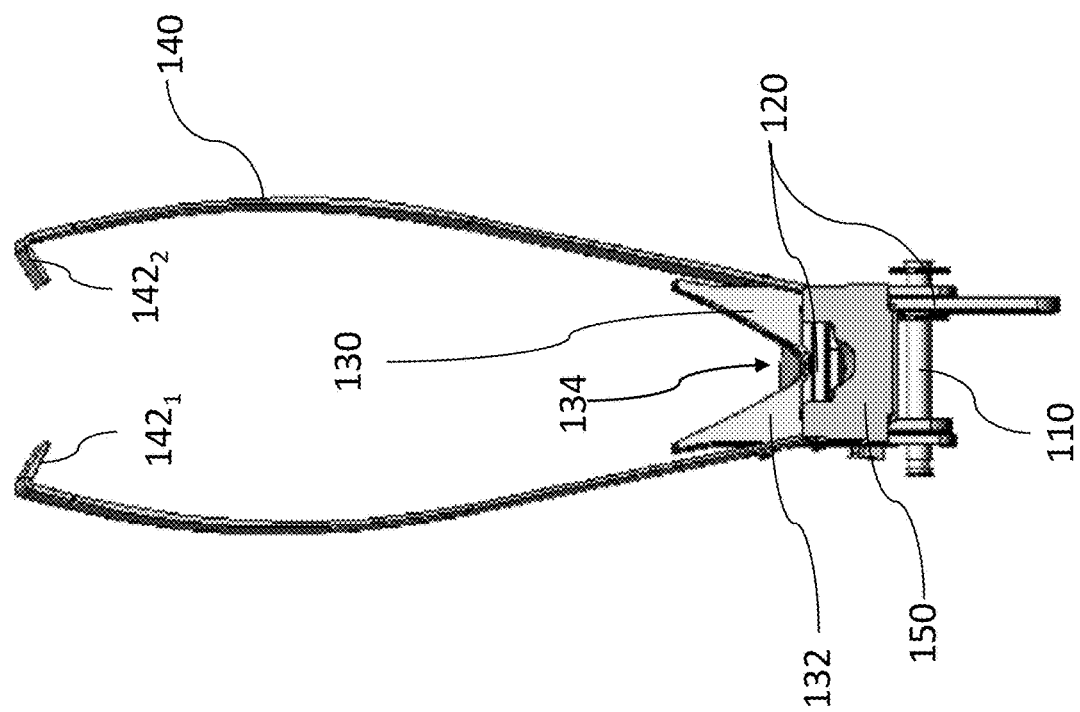
FIG. 2 is a top view of the bracket assembly of FIG. 1.

The drawings are not necessarily to scale and may be illustrated by phantom lines, diagrammatic representations and fragmentary views. In certain instances, details that are not necessary for an understanding of the implementations or that render other details difficult to perceive may have been omitted.

DETAILED DESCRIPTION

The examples and conditional language recited herein are principally intended to aid the reader in understanding the principles of the present technology and not to limit its scope to such specifically recited examples and conditions. It will be appreciated that those skilled in the art may devise various arrangements that, although not explicitly described or shown herein, nonetheless embody the principles of the present technology.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

For purposes of this application, terms related to spatial orientation such as front, rear, top, bottom, left, and right, are as they would normally be understood by a user of the object described, as oriented in standard usage. Terms related to spatial orientation when describing or referring to components or sub-assemblies of the disclosed elements, separately from the helmet should be understood as they would be understood when these components or sub-assemblies are mounted to the structure element, unless specified otherwise in this application.

With these fundamentals in place, we will now consider some non-limiting examples to illustrate various implementations of aspects of the present technology.

Referring initially to FIGS. 1 to 5, according to non-limiting implementations of the present technology, there is provided a bracket assembly 10 including a cylindrical body 110 extending along a main axis 112, a holding bracket 120, a groove element 130, a main bracket 140 and an elongated wedge-shaped element 150. More specifically and as will be described in greater details herein after, the main bracket 140 is adapted to be mounted on a structure element (not depicted) such that the bracket assembly 100 is selectively retained on the structure element. When assembled, it can be said that the structure element is at least partially sandwiched between the main bracket 140 and the groove element 130. The elongated wedge-shaped element 150 may be used to modify a clamping force of the bracket assembly on the structure element. To that end, the elongated wedge-shaped element 150 is insertable in an opening of the bracket assembly defined by the main bracket 140 and the holding bracket 120 collaboratively. In other words, the main bracket 140 and the holding bracket 120 define an open-ended channel 135 therebetween for insertion of the elongated wedge-shaped element 150. It can be said that the main bracket 140 and the holding bracket 120 cooperate so as to collaboratively form the open-ended channel 135 between the central portion 1203 and the central portion 1403. In an implementation, the cylindrical body 110 is a pin onto which the holding bracket 120 and the groove element 130 are mounted.

For ease of description, although the holding bracket 120 may have a one-piece construction (e.g., being integrally formed), the holding bracket 120 a central portion 1203 (see FIGS. 5A and 5B) extending parallel to the main axis 112 of the cylindrical body 110, a first leg 1201 and a second leg 1202. The first and second legs 1201, 1202 extend orthogonally from the central portion 1203 and toward the cylindrical body 110. When assembled, the first and second legs 1201, 1202 are attached to the cylindrical body 110. In the illustrative implementation of FIGS. 3 and 5, the holding bracket 120 has a U-shaped body with apertures near each end thereof and which are aligned so as to receive the cylindrical body 110. In some embodiments of the present technology, the holding bracket 120 can be embodied as a U-shaped bracket.

Figure 6:
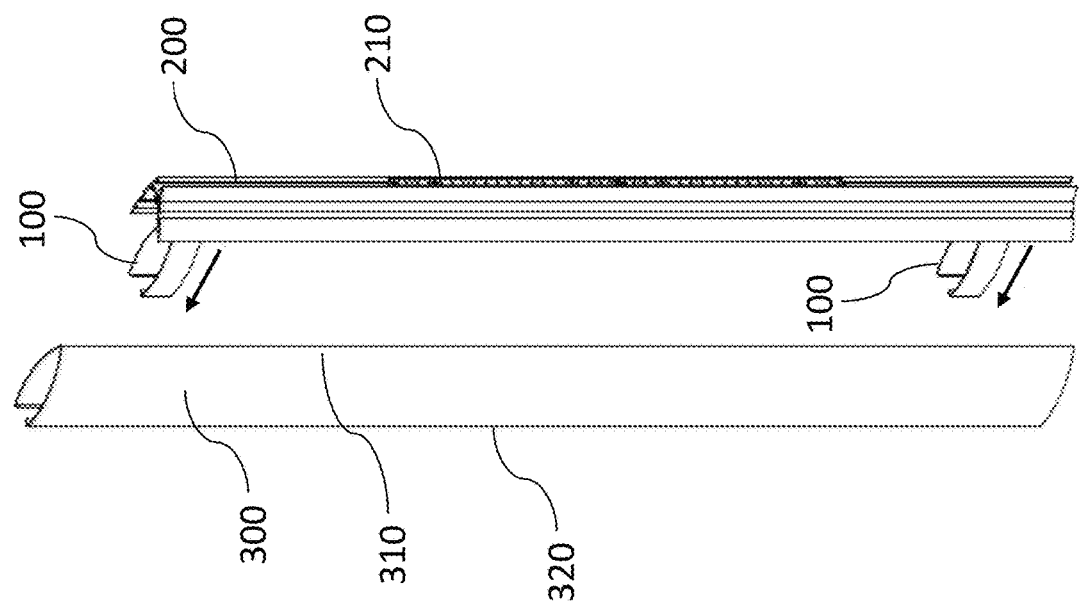
FIG. 6 is a perspective view taken from a top left corner of a portable equipment upon being mounted on a structure element via two bracket assemblies of FIG. 1 in accordance with a non-limiting implementation of the present technology.

For ease of description, although the groove element 130 may have a one-piece construction (e.g., being integrally formed), the groove element 130 has a body defining a groove 134 shaped for at least partially conforming to and receiving a first portion of the structure element on a first side of the groove element 130. With reference to FIG. 6, two bracket assemblies 100 are mounted on a portable equipment 200 to be mounted on a structure element 300. As best shown on FIG. 6, the portable element 200 may include a lighting system 210 (e.g. Light Emitting Devices (LEDs)) mounted thereon to emit light at least partly away from the bracket assembly 100.

In this implementation, the structure element 300 is extending vertically and has a fin-shaped cross-section. The structure element 300 may thus define a tip portion 310 and a base portion 320, the tip portion 310 corresponding to a tip of the fin-shaped cross-section, the base portion 320 corresponding to a base of the fin-shaped cross-section. It can be said that the structure element 300 has a width that tapers from a first width at the base portion to a comparatively smaller width at the tip portion 310. In this illustrative implementation, the groove 134 is shaped for at least partially conforming to and receiving the tip portion 310 of the structure element 300. It should be noted that the structure element 300 may have a different shape in alternative implementations. For example, the tip portion 310 may be square or defining a plurality of tips. The groove element 130 may define a plurality of grooves and/or define a groove that has a shape different from the shape of the groove 134 to at least partially match the shape of the tip portion 310. In some embodiments, it is contempered that a shape of the tip portion 310 may vary and that the groove element 130 may be configured to conform to a given shape of the tip portion 310 for providing lateral stability to the bracket assembly 100 when clamping onto the structure element 300.

The groove element 130 also includes a first leg 1301 and a second leg 1302 (see FIG. 8), the legs 1301, 1302 extending from the body on a second side opposite to the first side and toward the cylindrical body 110. When assembled, the legs 1301, 1302 are attached to the cylindrical body 110. Also when assembled, the second side of the body 132 may be in mechanical contact with the central portion 1203 of the holding bracket 120. In an implementation, the groove element 130 is formed of, for example and without limitation, glass-filled polycarbonate, or any plastic material.

In an implementation, the main bracket 140 is mounted on the holding bracket 120. More specifically, although the main bracket 140 may have a one-piece construction (e.g., being integrally formed), the main bracket 140 includes a central portion 1403, a first leg element 1401 and a second leg element 1402 extending orthogonally from the central portion 1403 and away from the cylindrical body 110. In an implementation, the main bracket 140 is a plate member bent into shape. It can be said that the main bracket 140 may have a generally U-shaped body with first and second leg elements 1401 and 1402.

In an implementation, the central portion 1403 of the main bracket 140 and the central portion 1203 of the holding bracket 120 are planar and extend parallel to each other, the open-ended channel 135 being thus defined, when assembled, between the central portion 1403 and the central portion 1203.

Figure 4B:
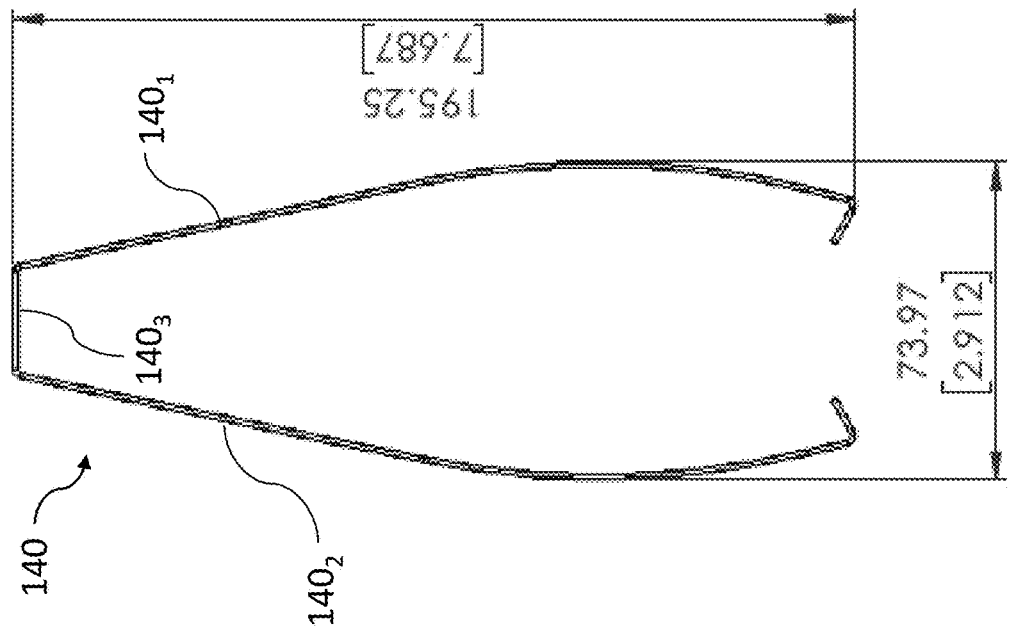
FIGS. 4A and 4B are respectively a side elevation view and a top view of a main bracket of the bracket assembly of FIG. 1 in accordance with a non-limiting implementation of the present technology.
Figure 4A:
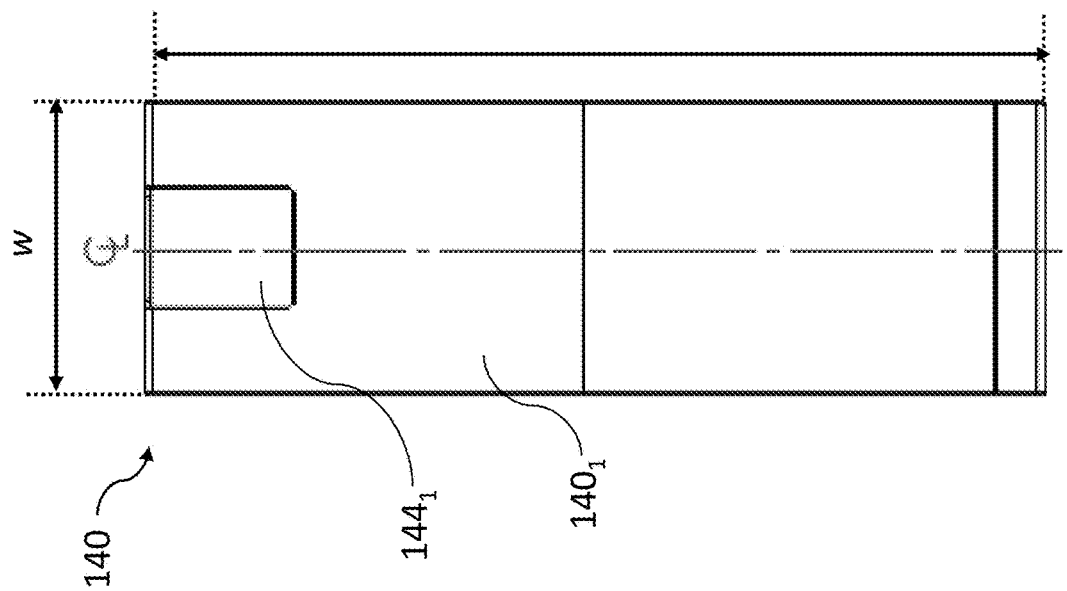
Figure 5B:
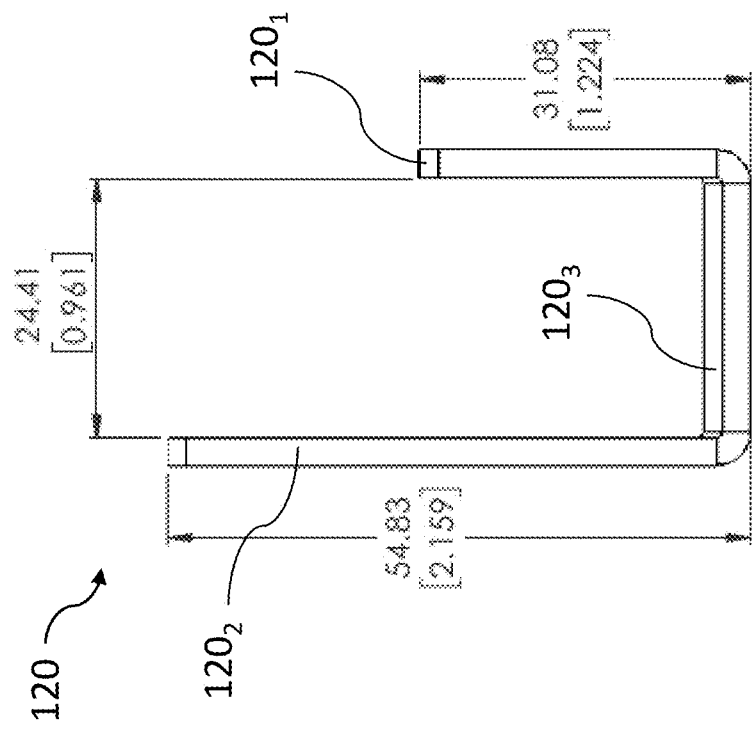
FIGS. 5A and 5B are respectively a side elevation view and a top view of a holding bracket of the bracket assembly of FIG. 1 in accordance with a non-limiting implementation of the present technology.
Figure 5A:
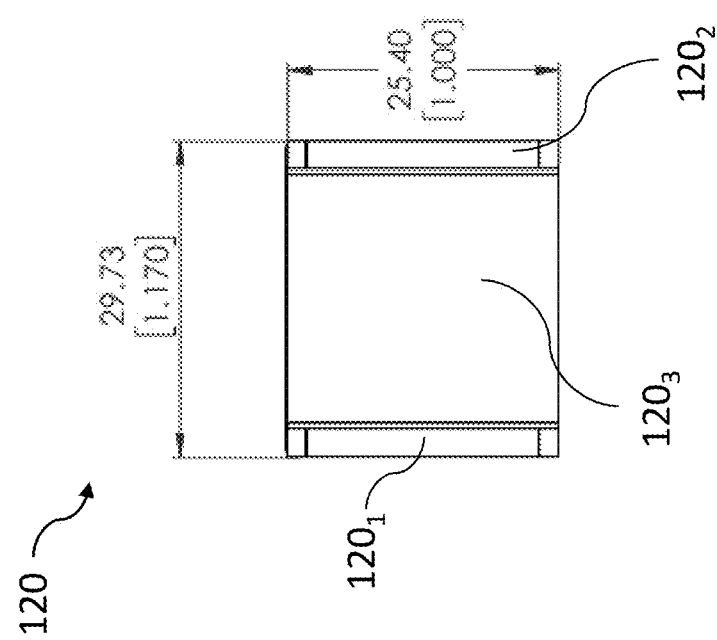

As best shown on FIGS. 1 and 4, each one of the leg elements 1401, 1402 defines an opening 1441 and 1442 respectively through which the legs 1201, 1202, 1301, 1302 extend when assembled. More specifically, the leg element 1401 defines a first opening 1441 through which the legs 1201, 1301 extend. Similarly, the leg element 1402 defines a second opening 1442 through which the legs 1202, 1302. As such, it can be said that the main bracket 140 and the holding bracket 120 are two intertwining U-shaped elements, the groove element 130 extending partly along the holding bracket 120.

In an implementation, the leg elements 1401, 1402 of the main bracket 140 are bent inwardly so as to form corresponding grasping end sections 1421, 1422 and which thereof at least partly extend inwardly. The grasping end sections 1421, 1422 are configured to grasp, when assembled, a portion of the structure element 300. In this implementation, said portion is the base portion 320 of the structure element as shown in FIG. 6.

For example and without limitation, a width w of the main bracket 140 is between 60 mm and 65 mm. For example and without limitation, the main bracket 140 is formed of, for example and without limitation, stainless steel.

Referring back to FIGS. 1 to 3, the elongated wedge-shaped element 150 is disposed, when assembled, in the open-ended channel 135. The elongated wedge-shaped element 150 extends between a first end 1501 and a second end 1502. A thickness of the elongated wedge-shaped element 150 increases from the first end 1501 to the second end 1502. It is contemplated the elongated wedge-shaped element 150 may have a thickness that tapers along its length. When assembled, the elongated wedge-shaped element 150 is slidable within the open-ended channel 135 collaboratively defined between the central portion 1403 and the central portion 1203. As shown, the ends 1501, 1502 includes abutting members 1521, 1522 to prevent the elongated wedge-shaped element 150 to entirely slide through the open-ended channel 135. In an implementation, the elongated wedge-shaped element 150 extends at least in part orthogonally to the main axis 112 of the cylindrical body 110 as shown on FIGS. 1 to 3.

The elongated wedge-shaped element 150 may thus be slidably moved between a first position and a second position, a plurality of intermediate position being defined between the first and second position. More specifically, the first position is reached in response to the abutting members 1521 of the first end 1501 abutting a lower edge of the main bracket 140 and/or a lower edge of the holding bracket 120, and the second position is reached in response to the abutting member 1522 of the second end 1502 abutting an upper edge of the main bracket 140 and/or an upper edge of the holding bracket 120. A plurality of intermediate positions are thus defined between the first and second positions.

It can be said that the elongated wedge-shaped element 150 may selectively move within the open-ended channel 135 between a given position and another given position, in the given position a first portion of the elongated wedge-shaped element 150 cooperates with the open-ended channel 135, the first portion having a first thickness. In the other given position, another portion the elongated wedge-shaped element 150 cooperates with the open-ended channel 135, the other portion having a second thickness, the second thickness being larger than the first thickness. The elongated wedge-shaped element 135 thus cooperates with the central portion 1203 and the central portion 1403 such that, in response to the elongated wedge-shaped element 150 being slidably moved from the given position to the other given position, the central portion 1203 is urged away from the central portion 1403 thereby increasing a clamping force applied by the grasping end sections 1421, 1422 and the groove element 130 on the structure element 300.

It should be noted that the open-ended channel 135 can vary in size according to a position of the elongated wedge-shaped element 150 therein. Indeed, in the first position, a first width of the elongated wedge-shaped element 150 occupies the open-ended channel 135. As the elongated wedge-shaped element 150 is slidably moved from the first position toward the second position, the width of the elongated wedge-shaped element 150 increases in the open-ended channel 135 which in turn increases the size of the open-ended channel 135. It can be said that the size of the open-ended channel increases due to an increasing distance between the central portion 1403 and the central portion 1203 separated by the increasing width of the edge-shaped element 150. This results in an increased clamping force applied onto the structure element 300 captured by the groove element 130 and the grasping end sections 1421, 1422. In the second position, a second width of the elongated wedge-shaped element 150 occupies the open-ended channel 135. In intermediate positions, corresponding intermediate widths of the elongated wedge-shaped element 150 occupy the open-ended channel 135. It can be said that as the elongated wedge-shaped element 150 is slidably moved between the first position toward the second position, the size of the open-ended channel 135 is progressively increased depending on a current width of the wedge-shaped element 150 in the open-ended channel 135.

Broadly speaking, a clamping force of the bracket assembly 100 increases in response to the elongated wedge-shaped element 150 being the second end 1502 being slidably moved toward the open-ended channel 135. More specifically, as the elongated wedge-shaped element 150 is slidably moved from the first position towards the second position, the thickness of the elongated wedge-shaped element 150 in the open-ended channel increases, causes to be thereby increasingly urging the groove element 130 against the tip portion 310 of the structure element 300. The structure element 300 is thus "clamped" between the groove element 130 and the grasping end sections 1421, 1422 of the main bracket 140, and where the clamping force is progressively increased during movement of the elongated wedge-shaped element 150 in the open-ended channel from its first position to the second position tightened.

It is contemplated that due to the shape of the groove element 130 at least partially conforming and receiving the tip portion 310, so-clamping the bracket assembly 100 onto the structure element 300 prevents and/or at least reduces lateral movement of the bracket assembly 100 relative to the structure element 300.

It is contemplated that in some embodiments of the present technology, the groove element 130 and the holding bracket 120 can be integrally formed.

Figure 7:
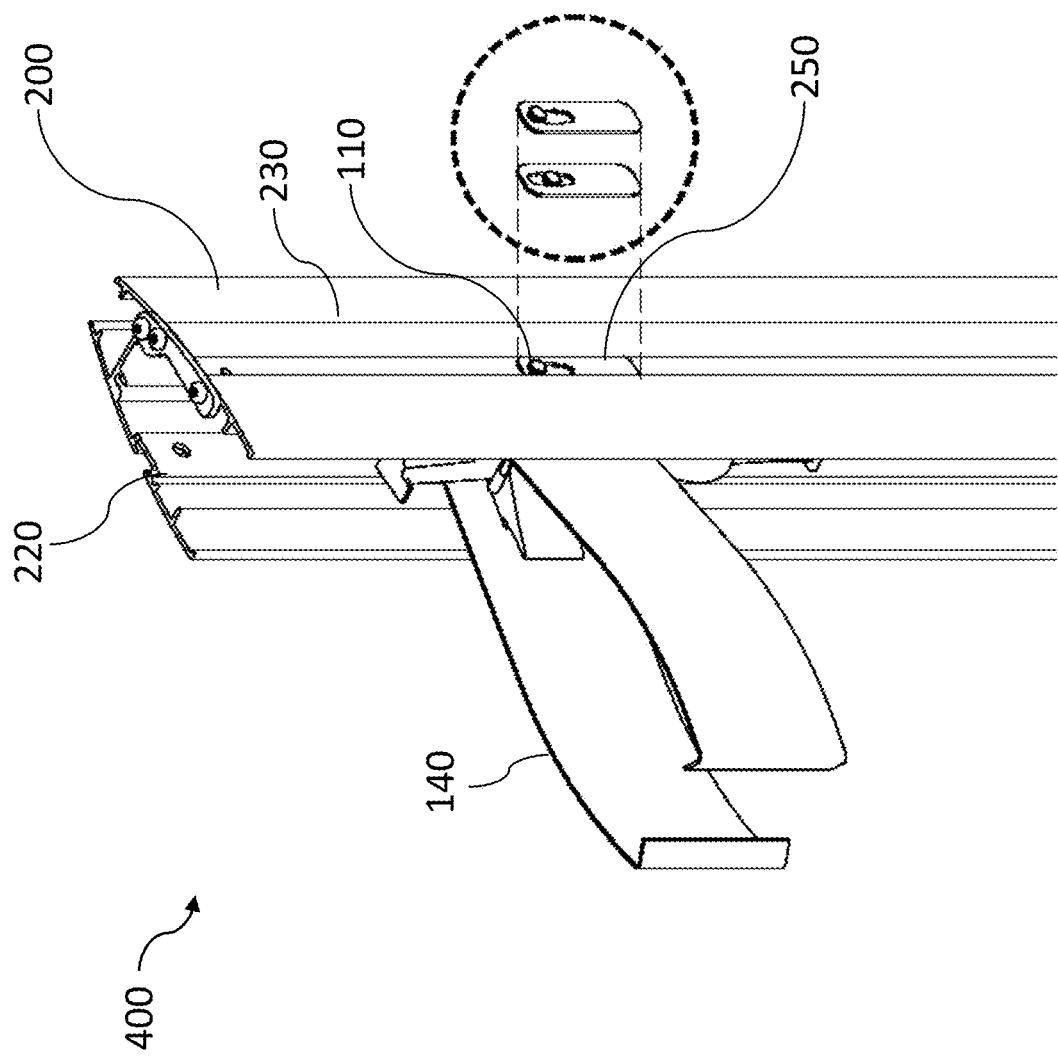
FIG. 7 is a perspective view taken from a rear top left corner of the bracket assembly of FIG. 1 mounted on the portable element, the portable element being in a close configuration.
Figure 8:
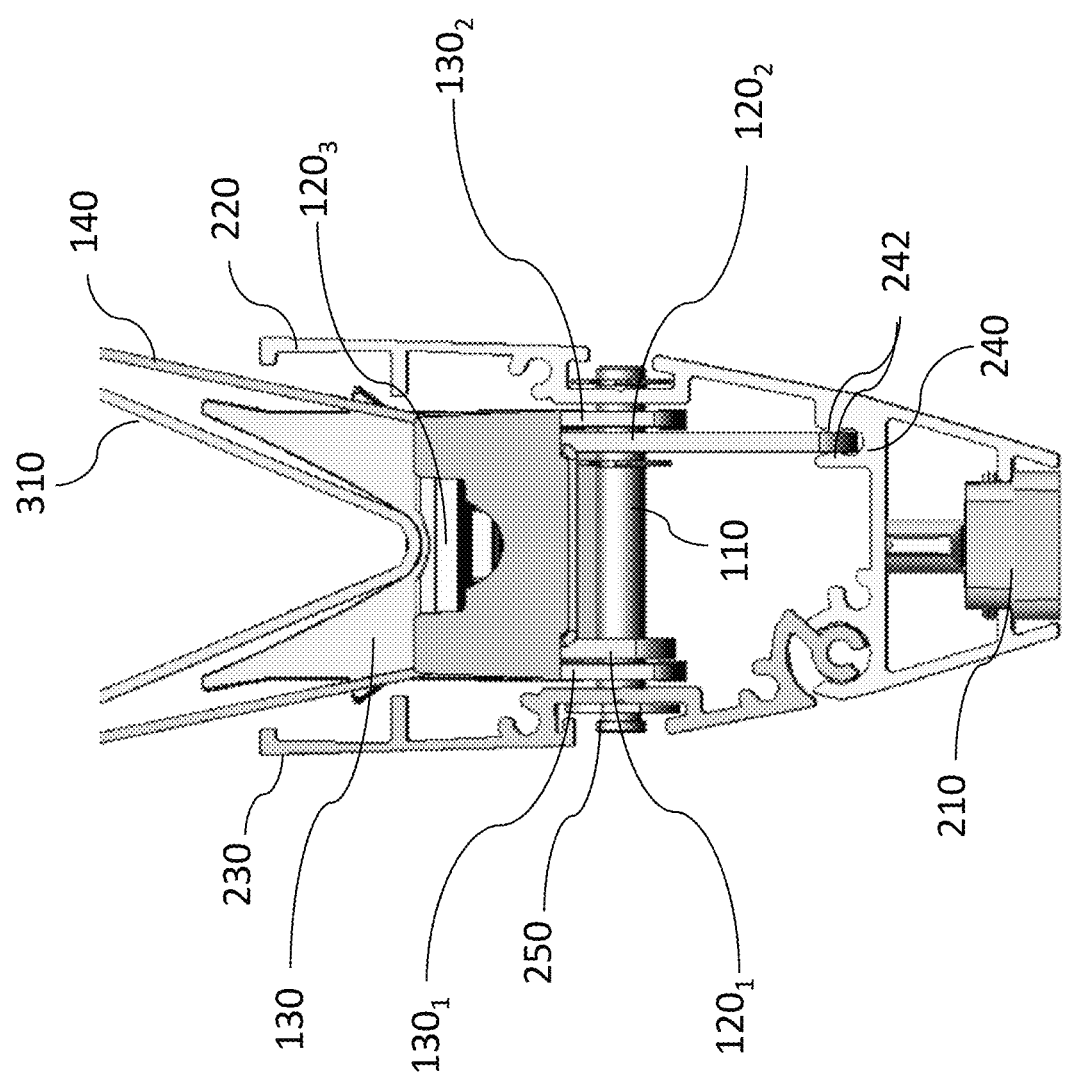
FIG. 8 is a cross-section view of the bracket assembly of FIG. 1 mounted on the portable element.

With reference to FIGS. 7 and 8, the main bracket 140 may be connected to the portable element 200. In the context of the present disclosure, assembly of one or more bracket assembly 100 with the portable element 200 may be referred to as a mounting module 400. As best shown on FIG. 8, the second leg 1202 of the holding member 120 may extend beyond the cylindrical body 110 and be attached to the portable equipment 200. The second leg 1202 may define recesses on lateral surfaces of an end portion thereof.

In an implementation, the portable equipment 200 includes an elongated body 220 and a panel 230 pivotably connected to the body 220. The elongated body 220 of the portable element 200 may define a clipping structure 240 comprising two protrusions 242 separated by a pre-determined distance and facing each other. It can be said that the elongated body 220 may have a U-shaped cross-section. The second leg 1202 may be connected to the elongated body 220 of the portable equipment 200 by being inserting the end portion thereof in the clipping structure of the elongated body 220 such that each protrusion 242 of the clipping structure is located in one of the recesses.

Alternatively or additionally, the bracket assembly 100 may be connected to the portable element 200 by securing the cylindrical body 110 in an opening defined in the elongated body 220 of the portable equipment 200 as shown in FIG. 8.

In the illustrative implementation of FIGS. 7 and 8, an axis of the pivot connection between the elongated body 220 and the panel 230 extends vertically, orthogonally to the main axis 112 of the cylindrical body 110.

FIG. 7 shows the portable equipment 200 in a close configuration where the panel 230 is secured to the bracket assembly 100. In said close configuration, the cylindrical body 110 is partially inserted in an opening defined in the panel 230 of the elongated body 200. In use, a locking device 250 may be used to lock the panel 230 on the cylindrical body 110. The locking device 250 may engage an end portion of the cylindrical body 110 extending, upon the portable element 200 being in the close configuration, through an opening defined in the panel 230, and thus lock the panel 230 in the closed configuration. For example, the locking device 250 may be a locking plate defining an opening with a varying size, as shown in FIG. 7. An end of the cylindrical body 110 may be inserted through the opening of the locking plate, and the locking plate may further be slid to reduce a size of the opening around a head of the cylindrical body, thereby locking said head of the end of the cylindrical body 110.

Figure 9:
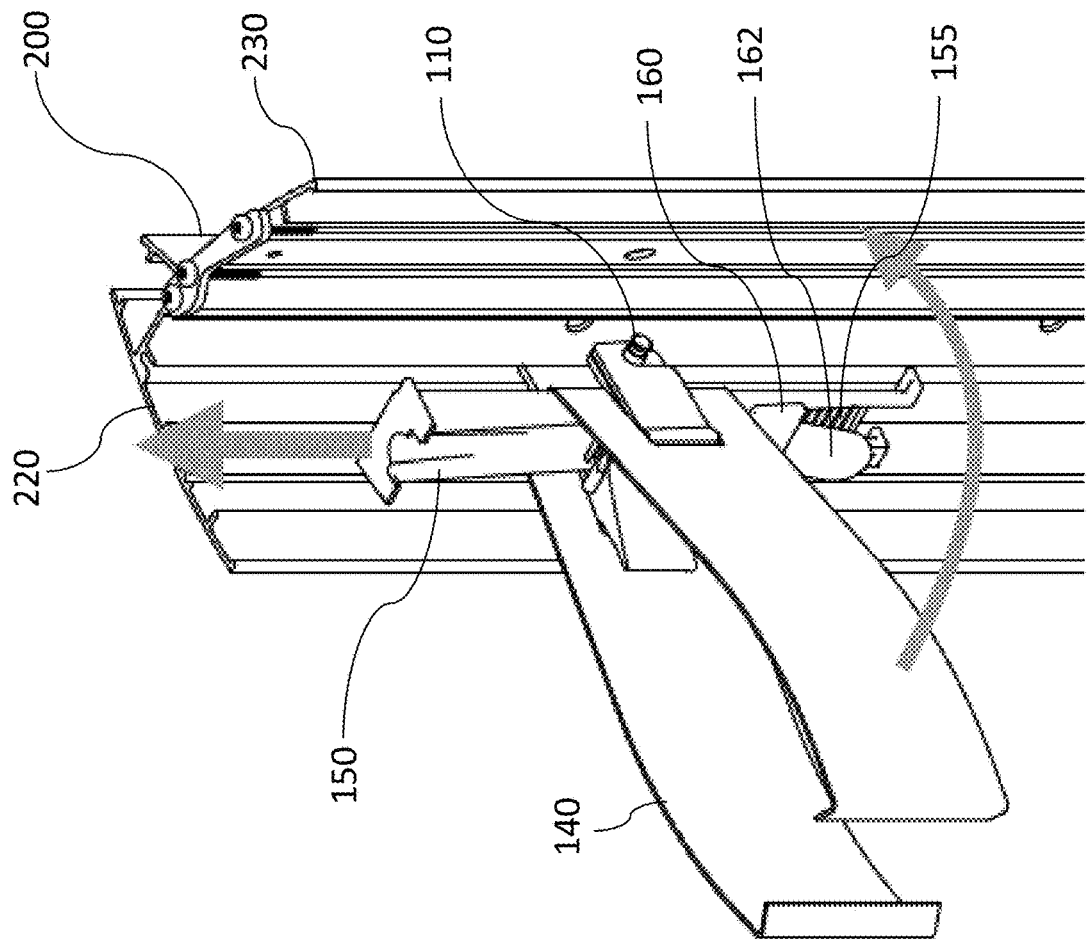
FIG. 9 is a perspective view taken from a rear top left corner of the bracket assembly of FIG. 1 mounted on the portable element, the portable element being in an open configuration.
Figure 10:
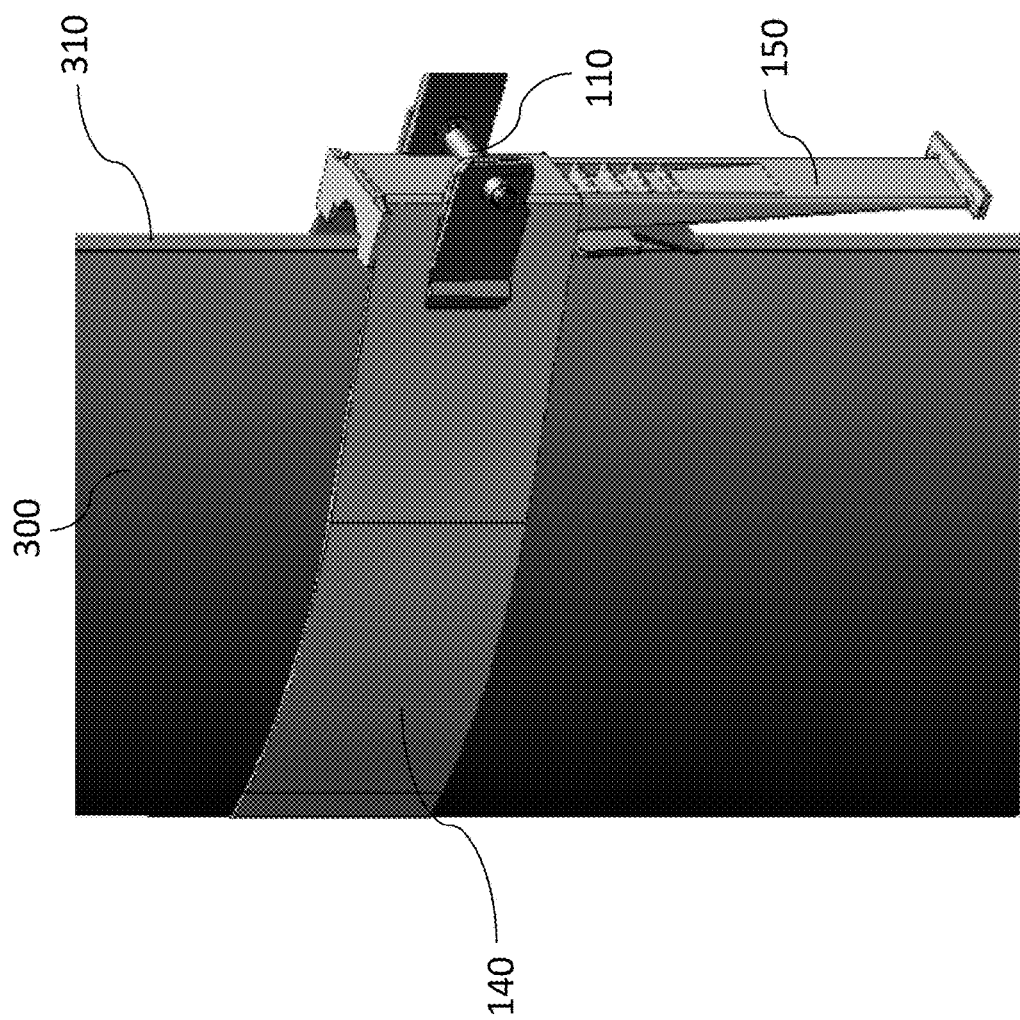
FIG. 10 is a perspective view taken from a front top left corner of the bracket assembly of FIG. 1 disposed on the structure element in accordance with a non-limiting implementation of the present technology.

Mounting of the bracket assembly 100 to the structure element 300 will now be described with reference to FIGS. 9 and 10. FIG. 10 does not show the portable element 200 to show the bracket assembly 100 mounted on the structure element 300. The bracket assembly 100 is connected to the elongated body 220 of the portable element 200 as described herein above, the portable element 200 being in the open configuration such that an operator of the bracket assembly may reach the bracket assembly 100.

Before being disposed on the structure element 300, the bracket assembly 100 is actuated is the loose configuration. To do so, the first end 1501 of the elongated wedge-shaped element 150 is moved (see vertical arrow on FIG. 9) toward the open-ended channel 135 of the bracket assembly 100 defined between the central portion 1403 and the central portion 1203. When the first end 1501 reaches the open-ended channel 135, the elongated wedge-shaped element 150 is in the first position.

In an implementation, the bracket assembly 100 includes a snapping lever 160 connected to the holding bracket 120 and extending along the elongated wedge-shaped element 150 and adapted to engage a notched surface 155 of the elongated wedge-shaped element 150. More specifically, the snapping lever 160 may define at least one protrusion extending toward the notched surface 155 and a tab 162 for pulling the snapping lever 162 away from the elongated wedge-shaped element 150. In an implantation, the tab 162 may have an angled portion that extends away from the elongated wedge-shaped element 150 to allows guiding an operator when releasing the elongated wedge-shaped element 150.

Figure 3:
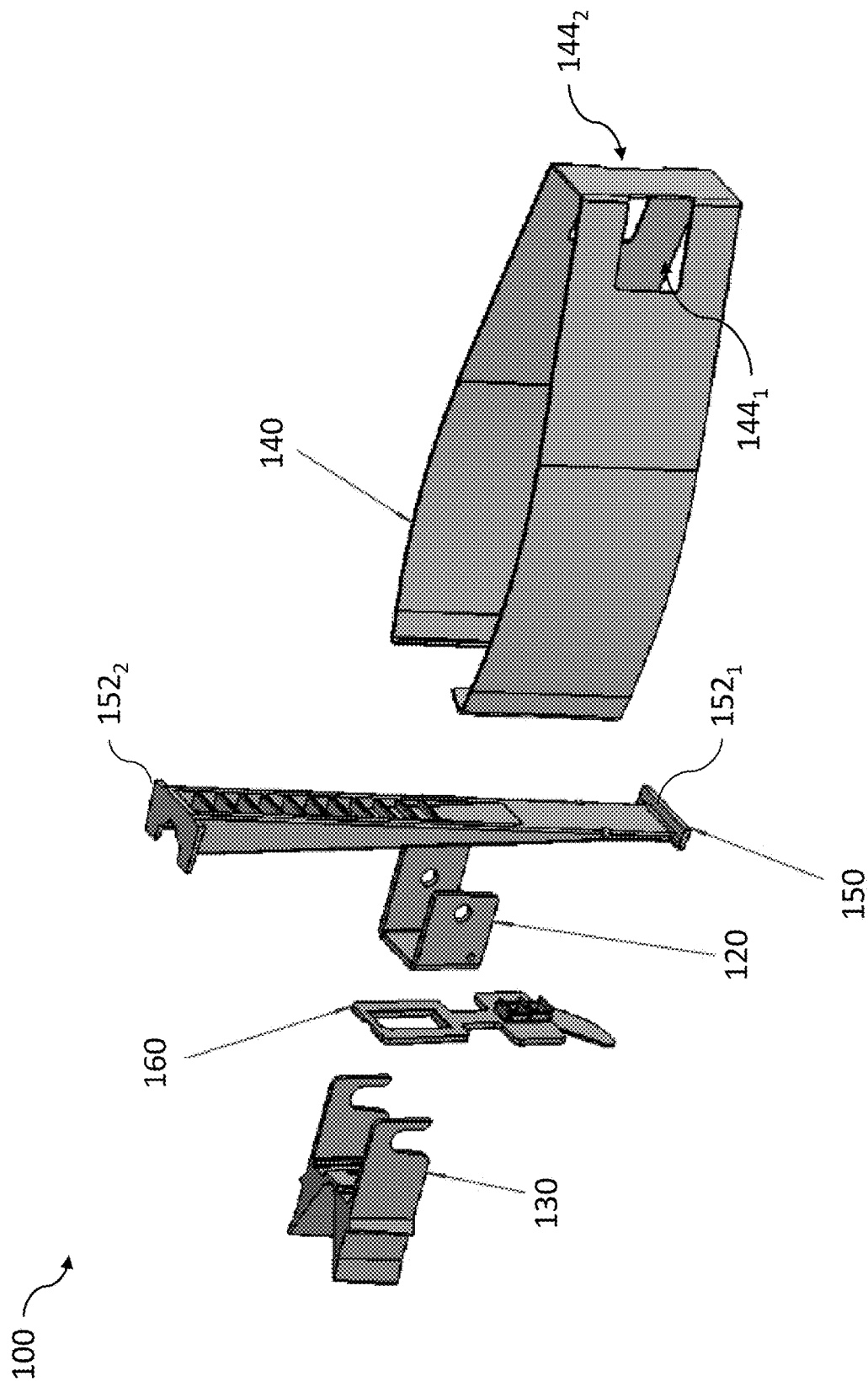
FIG. 3 is an exploded view of the bracket assembly of FIG. 1.

As best shown on FIG. 3, the body 132 of the groove element 130 is, when the bracket assembly 100 is assembled, at least in part in mechanical contact with the central portion 1203 of the holding bracket 120 such that a portion of the snapping lever 160 is sandwiched between the groove element 130 and the holding bracket 120.

In at least some embodiments, both the snapping lever 160 and the elongated wedge-shaped element 150 may include "teethed" interfaces configured to selectively engage each other during movement of the elongated wedge-shaped element relative to the snapping lever, and thereby selectively locking the elongated wedge-shaped element 150 in one or more intermediary tightening positions.

In use, a resilience of a junction between the snapping lever 160 and the holding bracket 120 causes the snapping lever 160 to abut the notched surface 155 of the elongated wedge-shaped element 150, and the at least one protrusion to engage at least one corresponding notch defined in the notched surface 155. Summarily, the snapping lever 160 may be used to prevent the elongated wedge-shaped element 150 from inadvertently sliding in the open-ended channel 135. An operator of the bracket assembly 100 may pull the tab 162 of the snapping lever 160 to be able to further move the elongated wedge-shaped element 150 in the open-ended channel 135.

Once the bracket assembly 100 is in the loose configuration, the bracket assembly 100 is disposed on the structure element 300 such that the tip portion 310 of the structure element 300 is received in the groove 134 of the body 132 of the groove element 130 and that the grasping end sections 1421, 1422 of the leg elements 1401, 1402 abut the base portion 320 of the structure element 300. The structure element 300 is thus clamped in the bracket assembly 100 and grasp between the grasping end sections 1421, 1422 and the groove element 130. In an implementation, a resiliency and/or a shape of the main bracket 140 prevent the bracket assembly 100, and by extension the mounting module 400, from disconnecting from the structure element 300. In another implementation, a resiliency and/or a shape of the main bracket 140 prevent the bracket assembly 100, and by extension the mounting module 400, from falling even when the bracket assembly 100 is in the loose configuration when the bracket assembly 100 is disposed on the structure element 300.

In at least some embodiments, the main bracket 140 may be configured to selectively engage the structure element 300 in a snap-fit configuration, where the operator may resiliently deform the leg elements 1401, 1402 for grasping the structure element 300 with the grasping end sections 1421, 1422.

In an implementation, the leg elements 1401, 1402 of the main bracket 140 are shaped such that, when assembled, at least a portion thereof is distant from the structure element 300 when the bracket assembly 100 is disposed on the structure element 300. This may increase stability of the mounting module 400 once it is mounted on the structure element 300. More specifically, a "play" is defined between the main bracket 140 and the structure element 300 due to a torque created by a weight of the mounting module 400. In response to said torque, a greater force is applied on upper portions of the grasping end sections 1421, 1422 than the lower portions of the grasping end sections 1421, 1422. This may prevent sliding of the mounting module 400 along the structure element 300.

The clamping force of the bracket assembly 100 may further be increased on the structure element 300 by further slidably moving the second end 1502 of the elongated wedge-shaped element 150 toward the open-ended channel 135 of the bracket assembly 100. In other words, the clamping force of the bracket assembly 100 may be increased on the structure element 300 by slidably moving the elongated wedge-shaped element 150 from the first position or any intermediate position toward the second position. In FIG. 9, the elongated wedge-shaped element 150 is in the first position. In FIG. 10, the elongated wedge-shaped element 150 is in the second position. The panel 220 of the portable element 200 may further be actuated in the close configuration and locked to the bracket assembly 100. For example, the locking device 250 may be used to lock the panel 230 on the cylindrical body 110.

Figure 11:
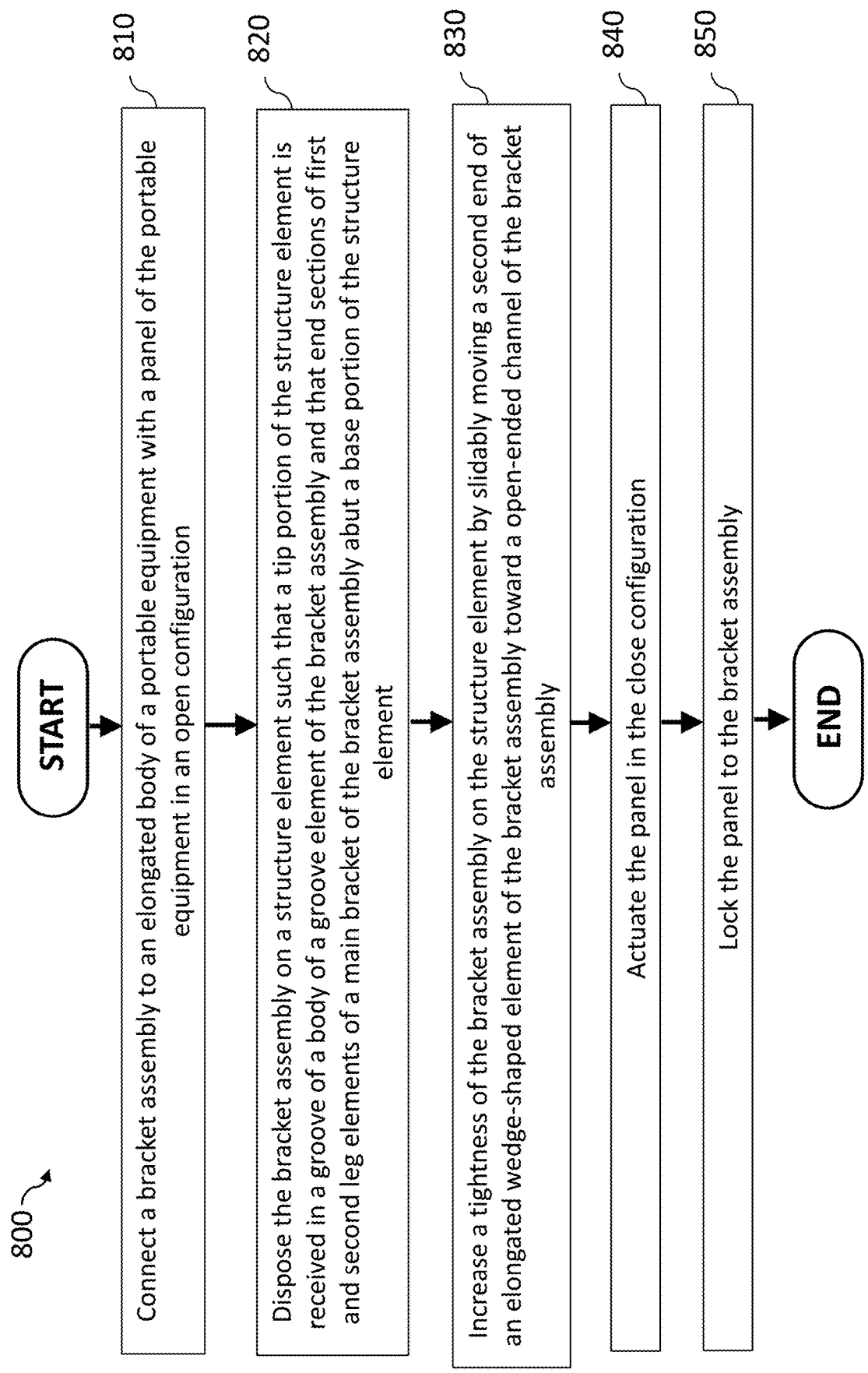
FIG. 11 illustrates a flow diagram showing operations of a method for supporting a portable element on a structure element by a bracket assembly in accordance with non-limiting examples of the present technology.

FIG. 11 is a flow diagram of a method 800 for supporting a portable element on a structure element by a bracket assembly according to some implementations of the present technology. The portable element may be the portable element 200, the structure element may be the structure element 300 and the bracket assembly may be the bracket assembly 100. Some steps or portions of steps in the flow diagram may be omitted or changed in order.

The method 800 may start with connecting, at operation 810, the bracket assembly 100 to the elongated body 220 of the portable equipment 200. At operation 810, the panel 230 of the portable element 200 may be in the open configuration such that an operator may access the bracket assembly 100.

In some implementations, said connecting may include inserting the end portion of the second leg 1202 of the holding bracket in the clipping structure 240 of the elongated body 220 such that each protrusion 242 of the clipping structure 240 is located in one of the recesses defined in the end portion of the first leg 1201.

The method 800 may continue with disposing, at operation 820, the bracket assembly 100 on the structure element 300 such that the tip portion 310 of the structure element 300 is received in the groove 134 of the groove element 130 and that the grasping end sections 1421, 1422 of the first and second leg elements 1401, 1402 grasp the base portion 320 of the structure element 300.

The method 800 may continue with increasing, at operation 830, a size of the open-ended channel 135 by slidably moving the elongated wedge-shaped element 150 from the first position to the second position. This causes the clamping force onto the structure element 300 by the grasping end sections 1421, 1422 and the groove element 130 to increase.

In some implementations, a plurality of bracket assemblies 100 may be provided and mounted on the portable element 200, as shown in FIG. 6. The method 800 may include consecutively increase the tightness of each bracket assembly 100 of the plurality of bracket assemblies 100, from a top bracket assembly 100 to bottom bracket assembly 100 along the structure element 300.

In some implementations, the method 800 may further include locking the elongated wedge-shaped element 150 in the second position using the snapping lever 160.

The method 800 may continue with actuating, at operation 840, the panel 230 in the close configuration.

The method 800 may end with locking, at operation 850, the panel 230 to the bracket assembly 100. For example, the panel 230 may define an opening for at least partially inserting the cylindrical body 110 upon being in the close configuration. A locking of the panel 230 to the bracket assembly 100 may thus include employing a locking device, such as the locking device 250, to engage an end portion of the cylindrical body extending through the opening to lock the panel 230 in the closed configuration.

In some implementations, the method 800 may further include decreasing the size of the open-ended channel 135 by slidably moving the elongated wedge-shaped element 150 from the second position to the first position and to reduce the clamping force onto the structure element 300 by the grasping end sections 1421, 1422 and the groove element 130.

While the above-described implementations have been described and shown with reference to particular operations performed in a particular order, it will be understood that these steps may be combined, sub-divided, or re-ordered without departing from the teachings of the present technology. At least some of the steps may be executed in parallel or in series. Accordingly, the order and grouping of the steps is not a limitation of the present technology.

Figure 12A:
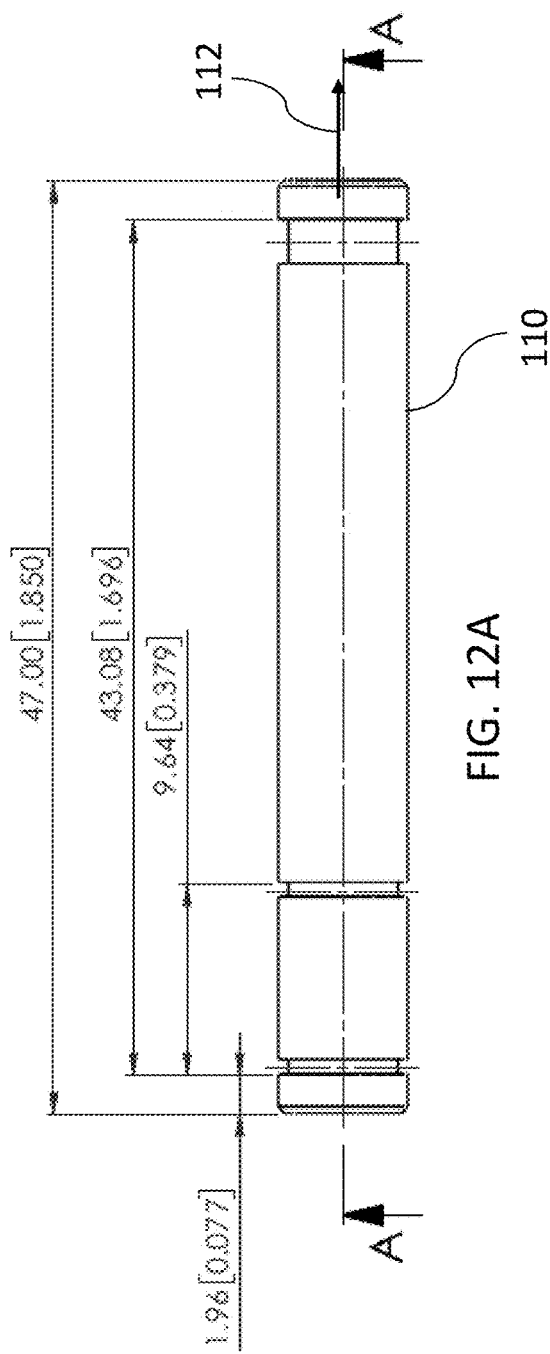
FIGS. 12A and 12B are respectively a side elevation view and a cross section view of a cylindrical body of the bracket assembly 100 of FIG. 1 in accordance with a non-limiting implementation of the present technology.
Figure 12B:
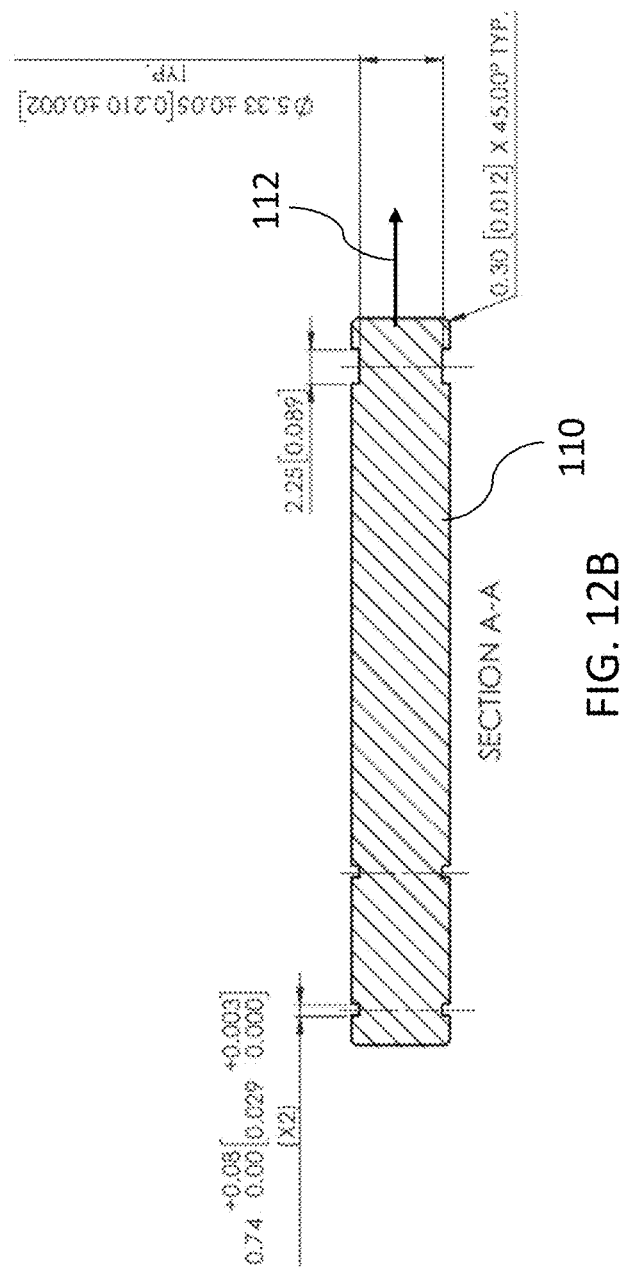
Figure 14:
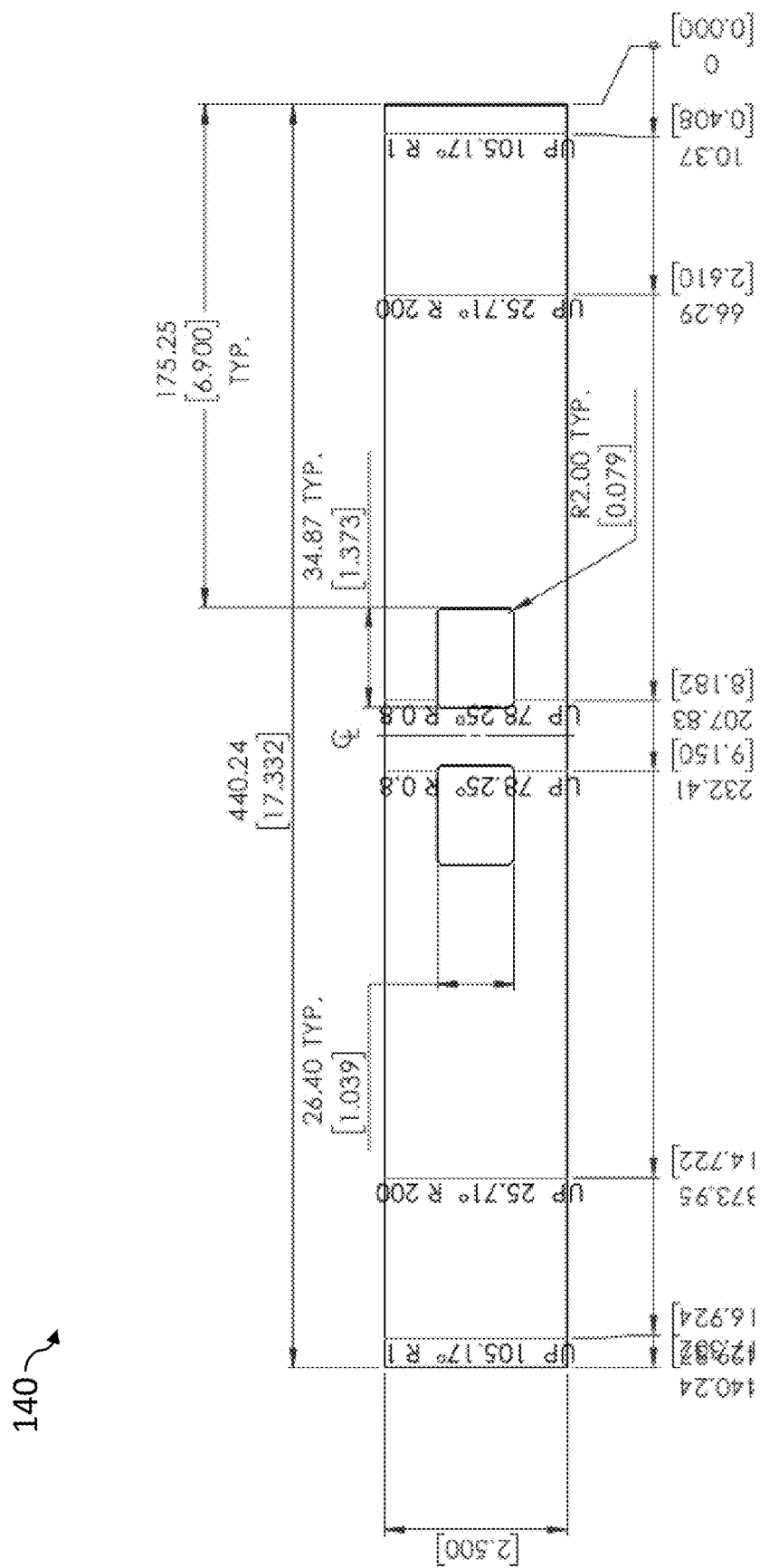
FIG. 14 is a flatten view of the main bracket of the bracket assembly of FIG. 1 in accordance with a non-limiting implementation of the present technology.

FIGS. 12A and 12B are respectively a side elevation view and a cross section view of the cylindrical body 110. FIGS. 13A, 13B and 13C are respectively a flatten view; a side elevation view and a cross section view of the holding member 120. FIG. 14 is a flatten view of the main bracket 140 of the bracket assembly 100. Dimensions indicated on FIGS. 12A, 12B, 13A, 13B, 13C, 14A and 14C should not limit the scope of the present technology. Said dimensions should be seen as one illustrative implementation of the present technology among other alternative suitable implementations. Dimensions indicated on the FIGS. 12A, 12B, 13A, 13B, 13C, 14A and 14C are in millimeters, values in inches are indicated between brackets.

Figure 15:
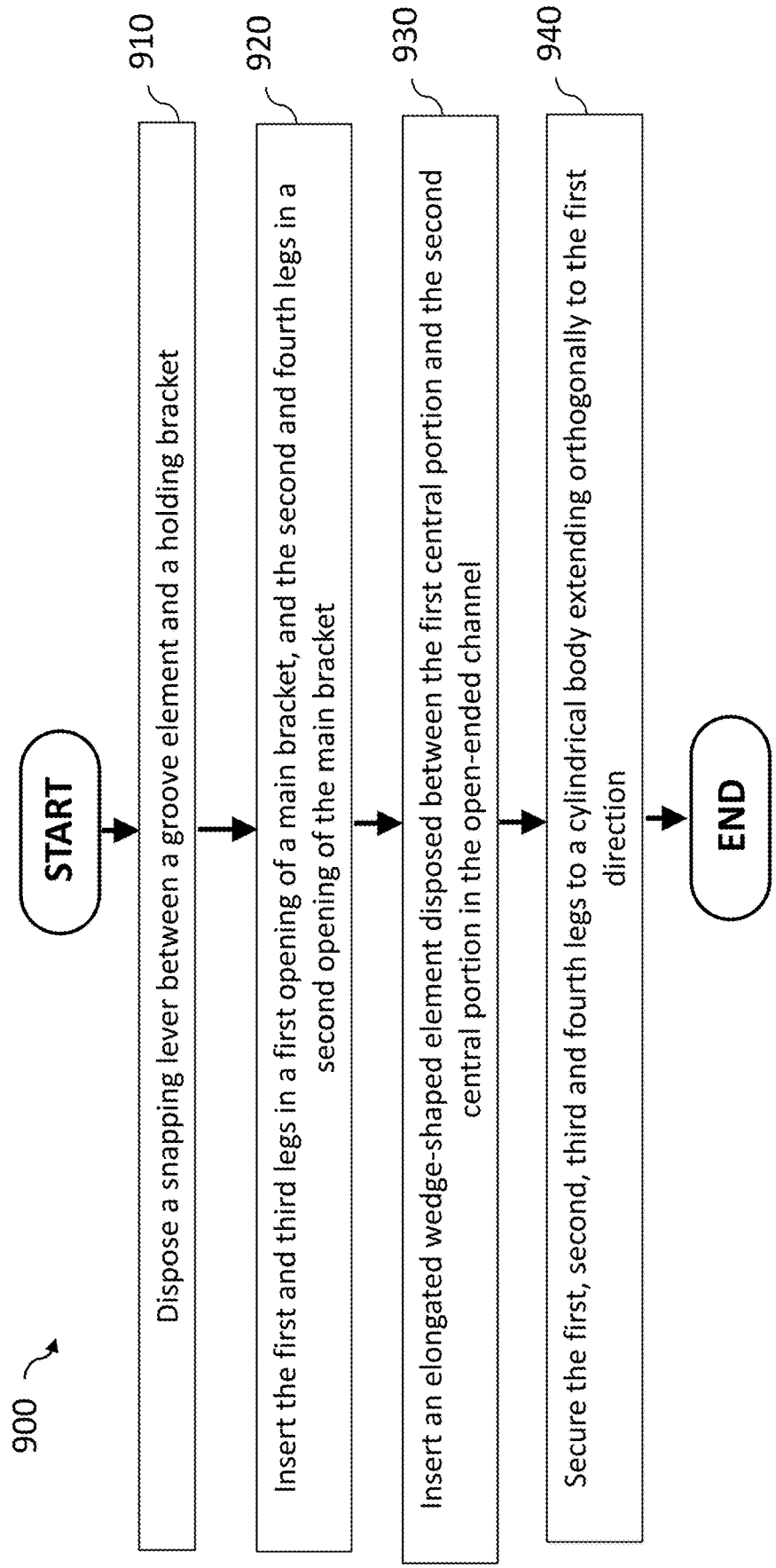
FIG. 15 illustrates a flow diagram showing operations of a method for assembling the bracket assembly FIG. 1 in accordance with non-limiting examples of the present technology.

FIG. 15 is a flow diagram of a method 900 for assembling a bracket assembly, such as the bracket assembly 100, according to some implementations of the present technology. Some steps or portions of steps in the flow diagram may be omitted or changed in order.

The method 900 may start with disposing, at operation 910, a snapping lever between a groove element and a holding bracket. The snapping lever may be the snapping lever 160. The groove element may be the groove element 130. The holding bracket may be the holding bracket 120.

The holding bracket includes a central portion and a first leg and a second leg, the first and second legs extending away from the central portion and toward a first direction.

The groove element includes a body defining a groove shaped for conforming to and receiving a first portion of a structure element on a first side of the groove element, the body being in mechanical contact with the central portion of the holding bracket when assembled, and a third leg and a fourth leg, the third and fourth legs extending away from the body on a second side opposite to the first side and toward the first direction, the second side of the body being at least in part in mechanical contact with the central portion of the holding bracket such that a portion of the snapping lever is sandwiched between the groove element and the holding bracket.

The method 900 may continue with inserting, at operation 920, the first and third legs in a first opening of a main bracket, and the second and fourth legs in a second opening of the main bracket. The main bracket may be the main bracket 140. The main bracket includes an other central portion substantially parallel to the central portion, and a first leg element and a second leg element extending away from the other central portion and away from the first direction, the first and second leg elements having grasping end sections configured to grasp a second portion of the structure element.

In this implementation, the main bracket and the holding bracket cooperate so as to collaboratively form an open-ended channel between the central portion and the other central portion.

The method 900 may continue with inserting, at operation 930, an elongated wedge-shaped element disposed between the first central portion and the second central portion in the open-ended channel. The elongated wedge-shaped element may be the elongated wedge-shaped element 150.

The elongated wedge-shaped element includes a first end and a second end, a thickness of the elongated wedge-shaped element increasing from the first end to the second end. The elongated wedge-shaped element may selectively move within the open-ended channel between a first position and a second position, in the first position a first portion of the elongated wedge-shaped element cooperates with the open-ended channel, the first portion having a first thickness, in the second position a second portion the elongated wedge-shaped element cooperates with the open-ended channel, the second portion having a second thickness, the second thickness being larger than the first thickness.

In this implementation, the snapping lever may releasably lock the elongated wedge-shaped element in the second position.

The method 900 may end with securing, at operation 940, the first, second, third and fourth legs to a cylindrical body extending orthogonally to the first direction. The cylindrical body may be the cylindrical body 110.

While the above-described implementations have been described and shown with reference to particular operations performed in a particular order, it will be understood that these steps may be combined, sub-divided, or re-ordered without departing from the teachings of the present technology. At least some of the steps may be executed in parallel or in series. Accordingly, the order and grouping of the steps is not a limitation of the present technology.

Variations and modifications will occur to those of skill in the art after reviewing this disclosure. The disclosed features may be implemented, in any combination and subcombinations (including multiple dependent combinations and sub-combinations), with one or more other features described herein. The various features described or illustrated above, including any components thereof, may be combined or integrated in other systems. Moreover, certain features may be omitted or not implemented. Examples of changes, substitutions, and alterations are ascertainable by one skilled in the art and could be made without departing from the scope of the information disclosed herein.

It should be expressly understood that various technical effects mentioned throughout the description above need not be enjoyed in each and every implementation of the present technology. As such, it is anticipated that in some implementations of the present technology, only some of the above-described technical effects may be enjoyed. While in other implementations of the present technology, none of the above enumerated technical effects may be present, while other technical effects not specifically enumerated above may be enjoyed. It should be expressly understood that the above enumerated technical effects are provided for illustration purposes only, to enable those skilled in the art to better appreciate implementations of the present technology and by no means are provided to limit the scope of the present technology or of the claims appended herein below.

It is noted that the foregoing has outlined some of the more pertinent non-limiting implementations. It will be clear to those skilled in the art that modifications to the disclosed non-implementation(s) can be effected without departing from the spirit and scope thereof. As such, the described non-limiting implementation(s) ought to be considered to be merely illustrative of some of the more prominent features and applications. Other beneficial results can be realized by applying the non-limiting implementations in a different manner or modifying them in ways known to those familiar with the art. This includes the mixing and matching of features, elements and/or functions between various non-limiting implementation(s) is expressly contemplated herein so that one of ordinary skill in the art would appreciate from this disclosure that features, elements and/or functions of one implementation may be incorporated into another implementation as skill in the art would appreciate from this disclosure that features, elements and/or functions of one implementation may be incorporated into another implementation as appropriate, unless described otherwise, above. Although the description is made for particular arrangements and methods, the intent and concept thereof may be suitable and applicable to other arrangements and applications.

What is claimed is:

1. A bracket assembly for clamping onto a structure element, the bracket assembly comprising:
    a cylindrical body extending along a main axis;
    a holding bracket comprising:
        a central portion; and
        a first leg and a second leg, the first and second legs extending away from the central portion, the first and second legs being configured to receive the cylindrical body;
    a groove element comprising:
        a body defining a groove shaped for conforming to and receiving a first portion of the structure element, the body being in mechanical contact with the central portion of the holding bracket; and
        a third leg and a fourth leg, the third and fourth legs extending away from the body, the third and fourth legs being configured to receive the cylindrical body;
    a main bracket comprising:
        an other central portion; and
        a first leg element and a second leg element extending away from the other central portion, the first and second leg elements including grasping end sections configured to grasp a second portion of the structure element, the main bracket and the holding bracket being configured to cooperate so as to collaboratively form an open-ended channel between the central portion and the other central portion; and
    an elongated wedge-shaped element disposed between the central portion and the other central portion, the elongated wedge-shaped element including a first end and a second end, a thickness of the elongated wedge-shaped element increasing from the first end to the second end,
    the elongated wedge-shaped element being configured to selectively move within the open-ended channel between a first position and a second position, in the first position a first portion of the elongated wedge-shaped element cooperates with the open-ended channel, the first portion having a first thickness, in the second position a second portion the elongated wedge-shaped element cooperates with the open-ended channel, the second portion having a second thickness, the second thickness being larger than the first thickness,
    the elongated wedge-shaped element being configured to cooperate with the central portion and the other central portion such that: when the elongated wedge-shaped element is slidably moved from the first position to the second position, the central portion is urged away from the other central portion thereby increasing a clamping force applied by the grasping end sections and the groove element on the structure element.

2. The bracket assembly of claim 1, wherein the cylindrical body is a pin.

3. The bracket assembly of claim 1, further comprising:
    a snapping lever connectable to the bracket assembly, the snapping lever configured to releasably lock the elongated wedge-shaped element in the second position.

4. The bracket assembly of claim 1, wherein the elongated wedge-shaped element is selectively movable along a plurality of intermediate positions between the first position and the second position.

5. The bracket assembly of claim 1, wherein the first leg element defines a first opening for receiving the first and third legs, and the second leg element defines a second opening for receiving the second and fourth legs.

6. The bracket assembly of claim 1, wherein the first and second leg elements are bent to form the grasping end sections.

7. A mountable module comprising:
    a portable equipment comprising an elongated body and a panel pivotably connected to the body between an open configuration and a close configuration, an axis of rotation of the panel with respect to the elongated body being substantially parallel to a first direction;
    at least one bracket assembly for clamping onto a structure element, each of the at least one bracket assembly comprising:
        a cylindrical body extending along a main axis;
        a holding bracket comprising:
            a central portion; and
            a first leg and a second leg, the first and second legs extending away from the central portion, the first and second legs being configured to receive the cylindrical body;
        a groove element comprising:
            a body defining a groove shaped for conforming to and receiving a first portion of the structure element, the body being in mechanical contact with the central portion of the holding bracket; and
            a third leg and a fourth leg, the third and fourth legs extending away from the body, the third and fourth legs being configured to receive the cylindrical body;
        a main bracket comprising:
            an other central portion; and
            a first leg element and a second leg element extending away from the other central portion, the first and second leg elements including grasping end sections configured to grasp a second portion of the structure element,
            the main bracket and the holding bracket being configured to cooperate so as to collaboratively form an open-ended channel between the central portion and the other central portion; and
        an elongated wedge-shaped element disposed between the central portion and the other central portion, the elongated wedge-shaped element including a first end and a second end, a thickness of the elongated wedge-shaped element increasing from the first end to the second end, the elongated wedge-shaped element being configured to selectively move within the open-ended channel between a first position and a second position, in the first position a first portion of the elongated wedge-shaped element cooperates with the open-ended channel, the first portion having a first thickness, in the second position a second portion the elongated wedge-shaped element cooperates with the open-ended channel, the second portion having a second thickness, the second thickness being larger than the first thickness, the elongated wedge-shaped being configured to cooperate with the central portion and the other central portion such that: when the elongated wedge-shaped element is slidably moved from the first position to the second position, the central portion is urged away from the other central portion thereby increasing a clamping force applied by the grasping end sections and the groove element on the structure element; and a locking device configured to engage an end portion of the cylindrical body extending, upon the panel being in the close configuration, through an opening defined in the panel, and thus lock the panel in the closed configuration.

8. The mountable module of claim 7, further comprising a lighting system mounted on the portable element to emit light at least partly away from the at least one bracket assembly.

9. The mountable module of claim 7, wherein the cylindrical body is a pin.

10. The mountable module of claim 7, wherein the bracket assembly further comprises:
    a snapping lever connectable to the bracket assembly, the snapping lever configured to releasably lock the elongated wedge-shaped element in the second position.

11. The mountable module of claim 7, wherein the elongated wedge-shaped element extends at least in part orthogonally to the main axis of the cylindrical body.

12. The mountable module of claim 7, wherein the at least one bracket assembly is two bracket assemblies.

13. A method for operating a bracket assembly, the bracket assembly for clamping to a structure element, the structure element having a fin-shaped cross-section, the structure element defining a tip portion and a base portion, wherein the bracket assembly comprises:
    a cylindrical body extending along a main axis;
    a holding bracket comprising:
      a central portion; and
      a first leg and a second leg, the first and second legs extending away from the central portion, the first and second legs being configured to receive the cylindrical body;
    a groove element comprising:
      a body defining a groove shaped for conforming to and receiving a first portion of the structure element, the body being in mechanical contact with the central portion of the holding bracket; and
      a third leg and a fourth leg, the third and fourth legs extending away from the body, the third and fourth legs being configured to receive the cylindrical body:
    a main bracket comprising:
      an other central portion; and
      a first leg element and a second leg element extending away from the other central portion, the first and second leg elements including grasping end sections configured to grasp a second portion of the structure element,
      the main bracket and the holding bracket being configured to cooperate so as to collaboratively form an open-ended channel between the central portion and the other central portion; and
    an elongated wedge-shaped element disposed between the central portion and the other central portion, the elongated wedge-shaped element including a first end and a second end, a thickness of the elongated wedge-shaped element increasing from the first end to the second end,
    the elongated wedge-shaped element being configured to selectively move within the open-ended channel between a first position and a second position, in the first position a first portion of the elongated wedge-shaped element cooperates with the open-ended channel, the first portion having a first thickness, in the second position a second portion the elongated wedge-shaped element cooperates with the open-ended channel, the second portion having a second thickness, the second thickness being larger than the first thickness,
    the elongated wedge-shaped element being configured to cooperate with the central portion and the other central portion such that: when the elongated wedge-shaped element is slidably moved from the first position to the second position, the central portion is urged away from the other central portion thereby increasing a clamping force applied by the grasping end sections and the groove element on the structure element,
    wherein the method comprises:
      disposing the bracket assembly on the structure element such that the tip portion of the structure element is received in the groove of the groove element and that the grasping end sections of a first and second leg elements grasp the base portion of the structure element; and
      increasing a size of the open-ended channel by slidably moving the elongated wedge-shaped element from the first position to the second position and to increase the clamping force onto the structure element by the grasping end sections and the groove element.

14. The method of claim 13, wherein the bracket assembly further comprises a snapping lever connected to the bracket assembly, the method further comprising:
    locking the elongated wedge-shaped element in the second position using the snapping lever.

15. The method of claim 13, further comprising decreasing the size of the open-ended channel by slidably moving the elongated wedge-shaped element from the second position to the first position and to reduce the clamping force onto the structure element by the grasping end sections and the groove element.

16. The method of claim 13, further comprising:
    connecting the bracket assembly to an elongated body of a portable element, the portable element comprising an elongated body and a panel pivotably connected to the body between an open configuration and a close configuration, an axis of rotation of the panel with respect to the elongated body being substantially parallel to a first direction.

17. The method of claim 16, further comprising actuating the panel in the close configuration.

18. The method of claim 17, further comprising locking the panel to the bracket assembly.

19. The method of claim 16, wherein the panel defines an opening for at least partially inserting the cylindrical body upon being in the close configuration, and locking the panel to the bracket assembly comprises:
employing a locking device configured to engage an end portion of the cylindrical body extending through the opening to lock the panel in the closed configuration.

20. The method of claim 16, wherein:
the second leg of the holding bracket extends beyond the cylindrical body and defines recesses on lateral surfaces of an end portion thereof,
the elongated body of the portable element defines a clipping structure comprising two protrusions separated by a pre-determined distance and facing each other; and
connecting the bracket assembly to the elongated body of the portable element comprises inserting the end portion of the second leg of the holding bracket in the clipping structure of the elongated body such that each protrusion of the clipping structure is located in one of the recesses.

* * * * *